No. 647,595. Patented Apr. 17, 1900.
C. BURROWS.
POULTRY ROOST.
(Application filed Dec. 14, 1898.)
(No Model.)

Witnesses
E. E. Overholt
A. H. Williams Jr.

Inventor
Cyrus Burrows.
By W. J. Fitzgerald
Attorney.

UNITED STATES PATENT OFFICE.

CYRUS BURROWS, OF PHŒNIX, ARIZONA TERRITORY, ASSIGNOR OF ONE-HALF TO REUBEN D. ROSENBERGER, OF MESA, ARIZONA TERRITORY.

POULTRY-ROOST.

SPECIFICATION forming part of Letters Patent No. 647,595, dated April 17, 1900.

Application filed December 14, 1898. Serial No. 699,283. (No model.)

*To all whom it may concern:*

Be it known that I, CYRUS BURROWS, a citizen of the United States, residing at Phœnix, in the county of Maricopa and Territory of Arizona, have invented certain new and useful Improvements in Poultry-Roosts; and I do hereby declare the following to be a full, clear, and exact description of the invention, such as will enable others skilled in the art to which it appertains to make and use the same.

My invention relates to an attachment for poultry-houses; and it consists of certain details of arrangement and construction of parts necessary to provide a support or "roost" for fowls of various kinds which will be found to be practically vermin-proof.

The object of my invention is to provide a roost or support for the fowls which may be readily removed from its operative position for purposes of cleansing the building or roost, a further object being to provide means by which the roost will be insured against the accumulation of vermin and at the same time enable the attendant to treat the feet of the fowls, so that the same will be free from scales or result of other diseased condition.

My invention will be fully illustrated in the accompanying drawings, in which—

Figure 1:
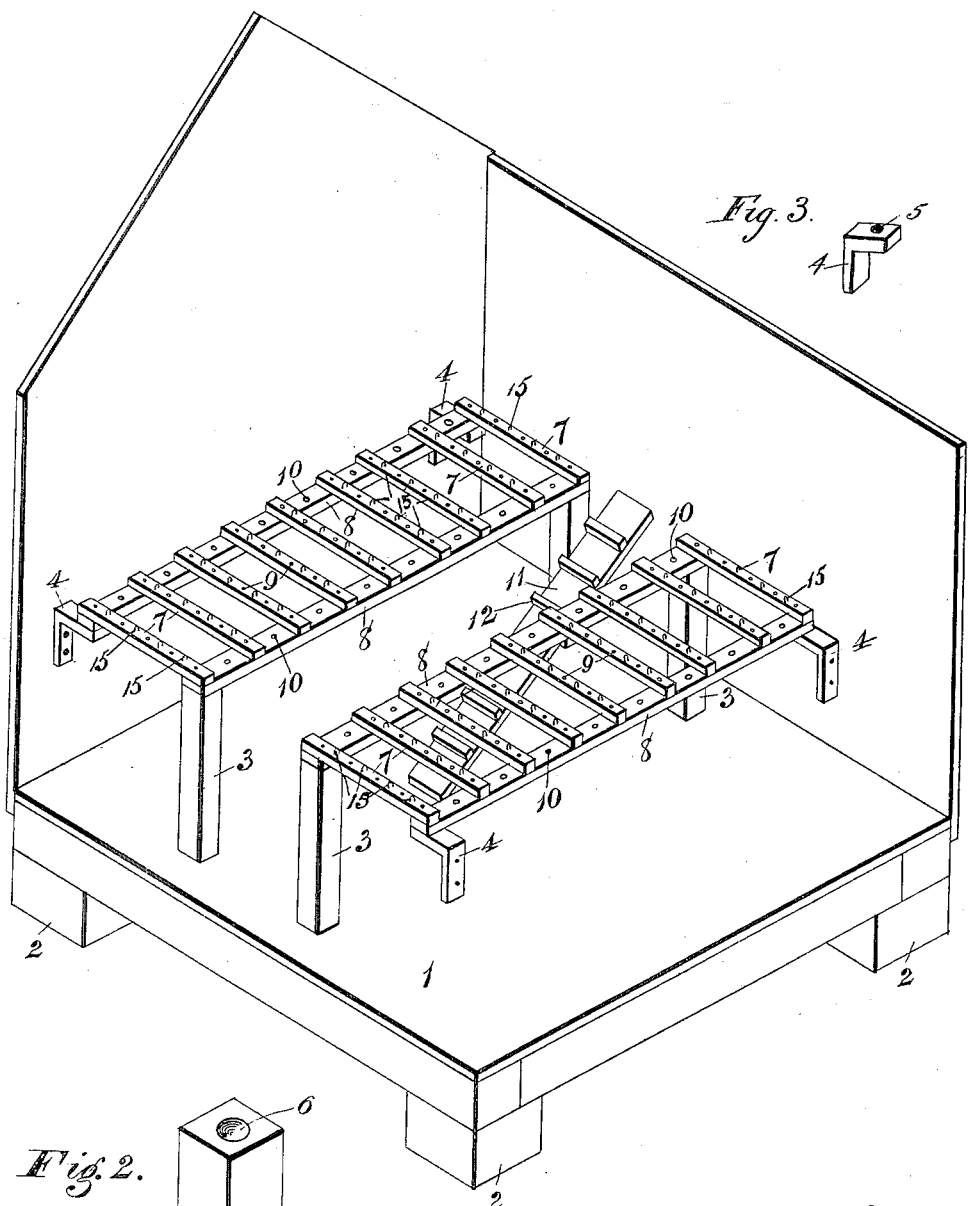
Figure 3:
Figure 2:
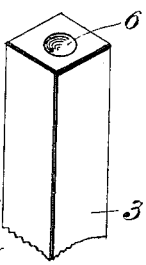

Figure 1 is a perspective view of my improved detachable roost, showing a portion of the building removed in order that the view may be unobstructed. Fig. 2 is a perspective view showing the upper end of one of the supporting-posts. Fig. 3 is a perspective view showing one of the brackets employed to support my improved roost.

Referring to the several parts of my invention and the accessories required to illustrate the same, 1 illustrates the floor of the poultry-house, constructed in the usual or any preferred manner, properly elevated and supported in position by the corner-posts 2. In carrying out my invention I erect at a proper location the posts 3, while secured to the adjacent wall are the brackets 4, each of which is provided with a recess or countersink 5, while each of the posts 3 is also provided with a single countersink 6, as shown in Fig. 2, the purpose of which is to enable a quantity of liquid or plastic form of composition designed to sterilize said parts and the parts resting upon them. Said composition will, it is thought, prove most valuable when prepared so as to slowly vaporize, thus providing that the fumes given off by it will permeate the feathers of the fowls above, and thus thoroughly cleanse the same from all variety of parasites.

The roost proper consists of a series of sections 7, which are preferably permanently attached to the supporting-sections 8, as by bolts, nails, or other preferred means. Each of the sections 7 is provided with a series of recesses 9, preferably corresponding in form to the recess shown in Fig. 2, and are designed for the same purpose—namely, to receive the medicated compound relied upon to sterilize the parts, and thus insure against the accumulation of vermin or parasites which would interfere with the health of the fowls. I form the recesses 9 in the section 7 in preference to providing therein a continuous groove, and thereby forming a trough for the reception of the medicated compound, inasmuch as each recess is located at a point which will be directly under the body of the fowl, leaving the remaining portion of the roost-section 7 smooth, and thereby better adapted as a comfortable resting-place for the feet. If a continuous trough is provided, it is obvious that the foot will contact with the roost-section at two places only, thus placing the foot in an uncomfortable position. A further advantage arising from the use of my construction is due to the fact that but a comparatively small quantity of the medicated compound is necessary and that the fumes arising therefrom will be directed into contact with the body of the fowl, since the staples or pins 15, hereinafter specifically referred to, will serve as partition-walls between each of the recesses, thereby insuring that the fowl will sit directly over and receive the fumes of said compound.

At intervals between the series of sections 7 I form in the upper surface of the supports 8 one or more recesses 10, the office of which is the same as the recesses 5, 6, and 9 above referred to.

In order that the fowls may be readily enabled to climb to the roost, I provide the inclined walk 11, provided with the series of cleats 12, as is usual.

It will be understood that while I have described and illustrated the preferred form of construction of the several parts referred to any slight modifications thereof are comprehended by me in this application, as it will be seen by reference to Fig. 3 that the brackets 4 may be connected to the supporting-sections 8 by the arm or hook 13, which is preferably permanently secured to the section 8, while the free end 14 is designed to take directly into the recess 5, provided in the bracket, thus insuring that the roost supported in this way will be completely isolated from the walls of the building.

By the arrangement illustrated it will be seen that a passage-way is provided between the posts 3 for the accommodation of the attendant and the inclined walk 11. It will also be clear that the roosts consisting of the sections 8 and 9 may be lifted entirely off their supports, when the floor may be rendered accessible and easily cleaned from time to time, as required.

By rendering the composition volatile a reliable method is provided for giving the fowls a medicated treatment, as circumstances may indicate as necessary. By constructing the parts in the manner set forth a cleanly condition is insured both for the fowls and the building containing them.

In order to force the fowls to roost directly over one of the recesses 9, I provide the staples 15, which are to extend upward sufficiently to prevent the fowl from comfortably sitting at this point. It will be understood that a simple pin, nail, or the like may be used in lieu of the staple and that the fowl will thereby be compelled to sit immediately over one of the recesses 9, and thus insure that the vapor arising from the vermicide compound will permeate the feathers, resulting in the destruction of any vermin adhering thereto.

Believing that the advantages of my invention will be fully apparent from the foregoing specification, considered in connection with the accompanying drawings, I will dispense with further reference to the details thereof.

Having thus fully described my invention, what I claim as new, and desire to secure by Letters Patent, is—

1. As an improvement in roosts for fowls, a suitable supporting-frame having side and end sections and a series of cross-bars, said frame and cross-bars having a series of recesses, the said cross-bars being provided with suitable partitions between each of said recesses whereby the fowl occupying the roost will be compelled to sit between said partitions and directly over one of said recesses substantially as specified and for the purpose set forth.

2. As an improvement in roosts for fowls, the combination with a suitable supporting-frame of a series of roost-sections proper, each of said sections being provided upon its upper surface with a plurality of recesses adapted to contain a medicated compound and further having a series of staples or pins between each of said recesses whereby a partition-wall will be formed which will cause the fowl to sit directly over one of said recesses and thereby receive the benefit of the medicated compound placed therein as specified and for the purpose set forth.

In testimony whereof I affix my signature in presence of two witnesses.

CYRUS BURROWS.

Witnesses:
J. ERNST WALKEN,
AMY COATS.